United States Patent
Karigan et al.

(10) Patent No.: US 6,328,118 B1
(45) Date of Patent: Dec. 11, 2001

(54) APPARATUS AND METHODS OF SEPARATION OF MATERIALS IN AN UNDER-BALANCED DRILLING OPERATION

(75) Inventors: Joseph Michael Karigan, Carrollton; Wesley Jay Burris, II, Flower Mound, both of TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/265,553

(22) Filed: Mar. 8, 1999

(51) Int. Cl.$^7$ .............................. E21B 21/06; B01D 19/00
(52) U.S. Cl. ........................ 175/66; 175/206; 210/788; 210/801; 210/803; 210/747; 210/170; 210/188; 210/512.1; 210/519; 210/523
(58) Field of Search ................... 175/66, 206; 210/744, 210/788, 801, 803, 804, 747, 170, 188, 512.1, 519, 523, 526

(56) References Cited

U.S. PATENT DOCUMENTS

| | | | |
|---|---|---|---|
| 4,209,381 | * | 6/1980 | Kelly, Jr. .................................. 175/66 |
| 4,515,607 | * | 5/1985 | Wolde-Michael ....................... 175/66 |
| 5,300,222 | | 4/1994 | Broussard, Sr. . |
| 5,415,776 | | 5/1995 | Homan . |
| 5,492,622 | | 2/1996 | Broussard . |
| 5,827,357 | | 10/1998 | Farion . |
| 5,928,519 | * | 7/1999 | Homan .................................. 175/66 |

FOREIGN PATENT DOCUMENTS

| | | |
|---|---|---|
| 2 110 109 | 6/1983 | (GB) . |
| 2 332 632 | 6/1999 | (GB) . |
| 2 336 118 | 10/1999 | (GB) . |

OTHER PUBLICATIONS

Ken Arnold, et al., "Surface Production Operations vol. 1," Gulf Publishing Company, Houston, Texas 1986.

Bruce Thistle, et al., "Horizontal Drilling of a Low Pressure Fractured Shale Reservoir With Crude Oil and Nitrogen," Paper 93–1103, CADE/CAODC Spring Drilling Conference, Apr. 1993.

Dale Eresman, "Underbalanced [sic] Drilling—A Regulatory Perspective," Paper No. 93–306, CADE/CAODC Spring Drilling Conference, Apr. 1993.

Pat Deis, et al., "Infill Drilling in the Mississippian Midale Beds of the Weyburn Field Using Underbalanced Horizontal Drilling Techniques," Paper No. 93–1105, CADE/CAODC Spring Drilling Conference, Apr. 1993.

Dale Eresman, "Underbalanced drilling guidelines improve safety, efficiency," Oil & Gas Journal, Feb. 28, 1994.

Robert R. Teichrob, "Low–pressure reservoir drilled with air/$N_2$ in a closed system," Oil and Gas Journal, Mar. 21, 1994.

EUB Alberta Energy and Utilities Board Interim Directive ID 94–3, "Underbalanced Drilling," Jul. 18, 1994.

(List continued on next page.)

Primary Examiner—William Neuder
(74) Attorney, Agent, or Firm—William M. Imwalle; John F. Booth

(57) ABSTRACT

Disclosed are improved apparatus and methods of separation and control of drilling fluids in under-balanced drilling. Separation is conducted at reduced pressures to improve gas separation efficiencies. Preferably, separation is performed in multiple steps of pressure drops to eliminate foaming and to enhance gas removal. Solids are removed from the shaped bottom of a separation pressure chamber by creating a slurry and fluidizing and agitating the slurry to enhance solids removal.

26 Claims, 4 Drawing Sheets

OTHER PUBLICATIONS

Fred Curtis, et al., "Underbalanced Drilling Operations—Correct Operating Procedures Using a Closed Surface Control System to Drill for Oil and Gas," Paper No. 95–106, CADE/CAODC Spring Drilling Conference, Apr. 1995.

B. Lunan, "Underbalance Drilling—Surface Control Systems," The Journal of Canadian Petroleum Technology, Sep. 1995, vol. 34, No. 7.

J. Adam et al., "Underbalanced coiled tubing sidetrack successful," Oil & Gas Journal, Dec. 18, 1995.

D. Brant Bennion, "Underbalanced operations offer pluses and minuses," Oil & Gas Journal, Jan. 1, 1996.

EUB Alberta Energy and Utilities Board General Bulletin GB 96–17, "Sour Underbalanced Drilling Operations With Emergency Planning Zones (EPZ'S) Encompassing Residents," Dec. 20, 1996.

J. Saponja, "Challenges with Jointed Pipe Underbalanced Operations," SPE 37066, Society of Petroleum Engineers, Inc., 1996.

Robert L. Cuthbertson, et al., "New Surface Equipment For Underbalanced Drilling," Hart's Petroleum Engineer International, Mar. 1997.

John Vozniak, et al., "Field Results Document Underbalanced Drilling Success," Hart's Petroleum Engineer International, Apr. 1997.

John P. Vozniak, et al., "Underbalanced Drilling Benefits Now Available Offshore," Hart's Petroleum Engineer International, May 1997.

D. Nessa, et al., "Underbalanced drilling system could revive field developments—Part 1," World Oil, Jul. 1997.

D. Nessa, et al., "Underbalanced drilling system could revive field developments—Part 2," World Oil Oct. 1997.

D. Nessa, et al., "Recent North Sea Success Build Confidence," Hart's Petroleum Engineer International, Sep. 1998.

Signa Engineering Corp., "UnderBalanced Operations Training and Reference Manual," Serial No. 0030, Dec. 1998.

Halliburton, Shell U.K. Exploration and Production Galleon Field; United Kingdom Underbalanced Capabilities, Apr. 6, 1999.

Maurer Engineering Inc. Manual Releases, "Underbalanced Drilling Manual," http://techweb.duncan.halnet.com/software/maurer/ubdrillm/ubddrillm.htm, Apr. 28, 1999.

Gas Research Institute, "Underbalanced Drilling Manual," GRI Reference No. GRI–97/0236 Date unknown.

Northland Energy Services, "Portfolio of Services & Equipment" Date unknown.

Northland Energy Corporation, Underbalanced Drilling Services Date unknown.

AP Energy Business Publications Pte Ltd., "Getting more for your money," PetroMin Date unknown.

Richard Mozley Limited, "The ultimate in separation technology . . . new high capacity large–diameter hydrocyclones" Date unknown.

* cited by examiner

APPARATUS AND METHODS OF SEPARATION OF MATERIALS IN AN UNDER-BALANCED DRILLING OPERATION

TECHNICAL FIELD

The present invention relates to improvements in methods of separation of materials in under-balanced methods of subterranean well drilling and apparatus used therein.

BACKGROUND

In under-balanced drilling, as opposed to conventional drilling, down-hole well pressure at the formation is maintained below the formation pressure by the utilization of a relatively light base drilling fluid. The under-balanced condition avoids contamination of the formation by reducing the chances that the drilling fluids and the "cutting," suspended solids produced by the action of the drill bit, will be forced into the permeable reservoir formation. Several types of base drilling fluid may be used in under-balanced drilling. Water-based and oil-based drilling muds may be used, however, water and lighter oil-based fluids, such as diesel fuel and crude oil, are more commonly used. In some situations the base drilling fluid will have a specific gravity too high to successfully use in an under-balanced well. In such situation, the controlled mixture of additives, such as nitrogen gas, to the base drilling fluid produces an operating fluid of a specific gravity selected to maintain an under-balanced well.

The higher formation pressures usually result in well formation fluids, such as hydrocarbon oil, hydrocarbon gas and well water, flowing into the well and mixing with the operating fluid and cuttings. The returning drilling stream reaches the surface wellhead as a mixture of formation oil, formation gas, well water, solid cuttings and operating fluid. If the operating fluid is oil-based, any liquid hydrocarbons produced from the well will mix with the operating fluid is oil-based, any liquid hydrocarbons produced from the well will mix with the water-based operating fluid. If additive gasses were mixed in forming the operating fluid, the additive gases will mix with any hydrocarbon gas produced in the well.

In under-balanced drilling the returning drilling streams is at elevated pressures and when separation of the stream elements is desired, separation must be performed in a closed container or tank. Unfortunately, liquid-gas separation is less efficient when performed at elevated pressure levels. It is important to remove as much hydrocarbon gas from the base drilling fluids as possible. Basic hydrocarbon equilibrium phase behavior dictates that lowering the separation pressure reduces the hydrocarbon gas remaining in solution as a liquid. However, reducing the separation pressure, to release the gas from the liquid, increases the actual gas volume, thereby complicating gas handling and flow issues. In conventional, balanced drilling the operating fluid is not impregnated with large quantities of well formation fluids and, consequently, the operating fluid does not need to be separated from the returning stream at the surface at elevated pressure.

In a closed, balanced drilling system, controlling the specific gravity of the operating fluid flowing into the well is relatively uncomplicated, making maintenance of the stability of the well relatively simple. In under-balanced drilling the fluid mixture circulating in the well is not a closed system because of the addition of formation fluids down-hole. The influx of these formation fluids and gases greatly complicates the problem of under-balance pressure control through operating fluid specific gravity management.

Separation of the well formation fluids from the base drilling fluids is necessary before the base drilling fluids may be returned to the well and is accomplished by processing the returning stream through a separation system. The separation system should have the capacity to remove approximately the same or in excess of the volume of gas from the returning stream as is being added to the operating fluids down-hole. That is, the separation system should keep up with production of formation gas from the well to maintain the stability of the well during drilling operations.

Complicating matters, the separation system must handle typical wellhead pressures of the returning stream, which during under-balanced drilling can range from 25 psi to 3000 psi. Wellhead pressures are typically maintained as low as possible but still high enough to handle the returning stream volume. Reducing the pressure of the returning stream from the wellhead operating pressure by venting into a closed chamber can cause foaming, which reduces the efficiency of the liquid-gas separation process.

During drilling a large volume of heavy cuttings is produced and returned to the surface wellhead in the returning stream. In conventional drilling the returning stream is treated with shale shakers and mud pits. In under-balanced drilling it is necessary to remove the cuttings, or solids produced during drilling, from the returning stream mixture in the pressurized tanks to prevent clogging of the tanks. For safety reasons, in under-balanced drilling, it is first necessary to remove the gases from the returning stream. Removal of the solids from the pressurized chambers without shutting down the drilling operation presents difficulties.

SUMMARY OF THE INVENTION

The present invention contemplate improved methods and apparatus for separation and control of drilling fluids in under-balanced drilling. The present inventions separate the base drilling fluids from the solids, additive gases, well gases and well liquids. The present invention also perform liquid-gas separation at a reduced returning drilling fluid pressure. As an added advantage, the methods and apparatus of the present invention can be used with (upstream of) conventional atmospheric pressure shale shakers, mud pits and the like. In addition, the present invention uses a multi-step (two or more) controlled pressure drop during separation. The smaller controlled pressure drops prevent foaming and thus separation efficiency is increased. The present invention control the separated solids by collecting them by gravity in a shaped chamber bottom head. A solids slurry is formed with the solids and is agitated or fluidized and moved out a bottom discharge. The solids slurry may be fluidized by a sparging line or ring to wash or flow the solids out the bottom. Alternatively a vortex generator can be used in the chamber to agitate and move the solids out through the chamber discharge.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. The various advantages and features of the present inventions will be apparent from a consideration of the drawings in which.

DETAILED DESCRIPTION

Figure 1:
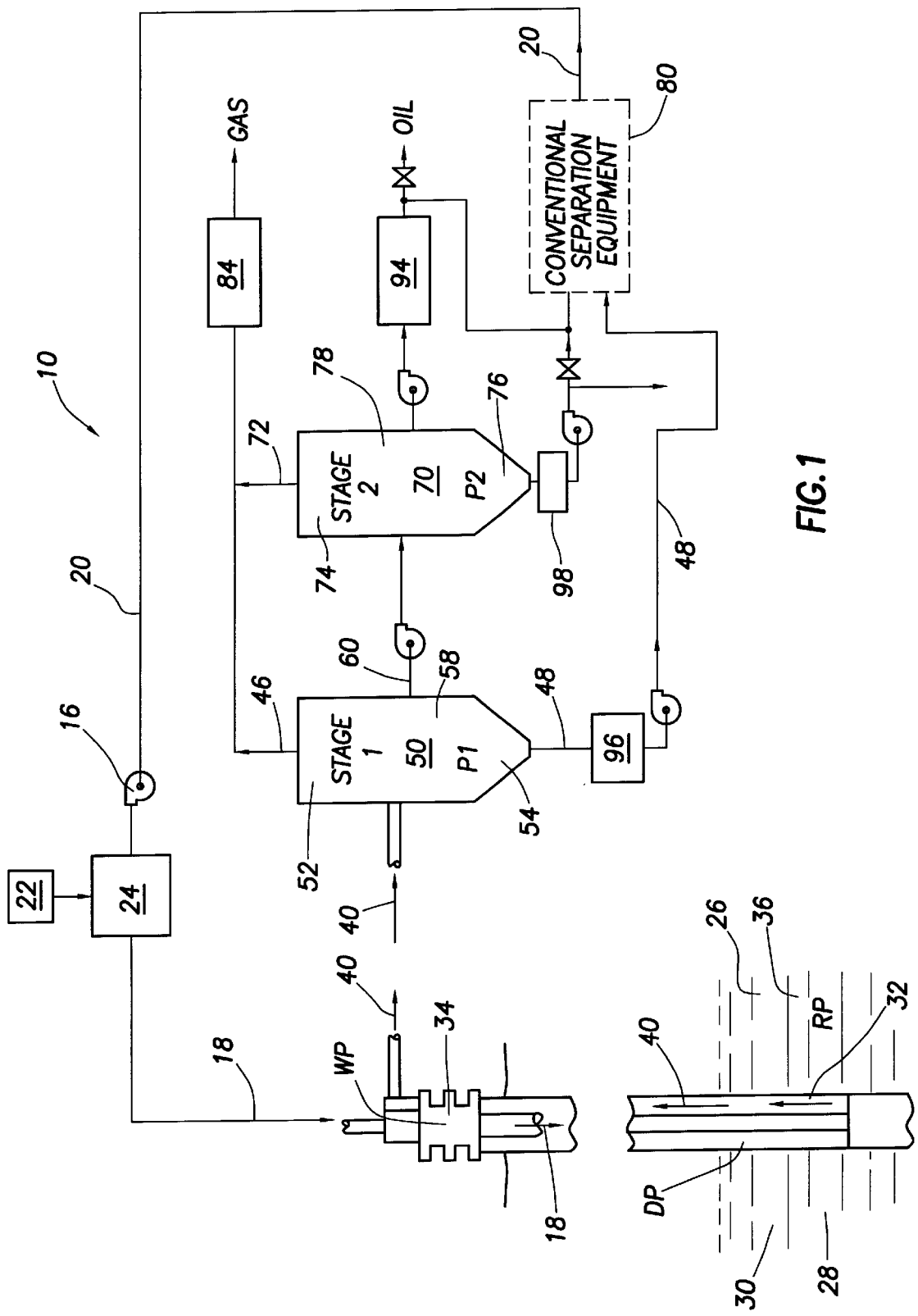
FIG. 1 is a schematic view of an improved apparatus for practicing the improved method for separation and control of drilling fluids during under-balanced drilling of the present invention.

The present invention will be described by referring to the drawings of apparatus and methods showing various examples of how the invention can be made and used. In these drawings, reference characters are used throughout the several views to indicate like or corresponding parts.

In FIG. 1, one embodiment of a drilling fluid separation and control system 10 for use in under-balanced drilling is shown. A selected operating fluid is used in an under-balanced well formation 26 as shown. The base drilling fluid 20 is relatively light and may consist of water-based mud or oil-based mud, but is more likely to be a water-based fluid or a lighter oil-based fluid, such as diesel fuel, crude oil or the like. The specific gravity of the base drilling fluid 20 can be altered by mixing an additive 22, typically a control gas, into the drilling base fluid 20 in a mixer 24, such as is known in the art, to create an operating fluid 18 for introduction into the well. The additive 22 may be nitrogen, carbon dioxide, a hydrocarbon gas or other gases as is known in the art. Various pumps, tubing, valving and control devices, such as pump 16, may be used as is known in the art. The specific gravity of the operating fluid 18 is manipulated to maintain the down-hole well bore pressure DP at least than the reservoir pressure RP present in the formation 26.

The operating fluid 18 is circulated down-hole where well formation materials, such as hydrocarbon oil 28, hydrocarbon gas 30, and well water 36 flow into the well and mix with the operating fluid 18 to create a returning drilling stream 40. Depending on the formation, oil, gas and water may be produced independently or simultaneously. One of the purposes of the returning stream 40 is to carry cutting solids 32 back to the surface wellhead 34. The mixture returning from down-hole, the returning drilling stream 40, therefore may include formation oil 28, formation gas 30, base drilling fluid 20, cutting solids 32, additive gas 22, and formation water 36 depending on the formation fluids produced by the well.

If the base drilling fluid 20 is oil based, the formation oil 28 will mix with and dilute the base oil used to initiate drilling. Similarly, if the base drilling fluid 20 is water based, the well water will mix with and dilute the water used originally to begin operations. This mixing is typically considered acceptable or desirable as the well water or native crude becomes the base drilling fluid. Lastly, the additive gases will mix with any hydrocarbon gas produced from the well.

The returning stream 40, once at the surface, is under a wellhead pressure WP which can typically range from 25 psi to 3000 psi. When separation of the stream elements is desired, separation must be performed in a closed container or tank. Unfortunately, liquid-gas separation is less efficient when performed at elevated pressure levels. Basic hydrocarbon equilibrium phase behavior dictates that lowering the separation pressure reduces the hydrocarbon gas remaining in solution as a liquid. However, reducing the separation pressure, to release the gas from the liquid, increases the actual gas volume, thereby complicating gas handling and flow issues. The pressurized system presented allows the flexibility of varying the separation pressure to balance the opposing goals of releasing as much gas as possible from the returning stream 40 and avoiding releasing more gas than the system has the capacity to handle.

The returning stream 40 is directed into a first stage separation process 50 to undergo a first stage of separation at a first pressure P1. The pressure P1 in the first stage separation process 50 may vary greatly but is typically around 25 psi. The reduction in pressure, if desired, from the wellhead pressure WP to the first stage pressure P1 allows for the more efficient separation of formation gas 30 from the returning stream 40. Appropriate pressure reduction and control equipment, as is known in the art, may be employed in transfer of the returning stream 40 to the first stage 50.

In the first stage 50, formation gas 30 and additive gas 22 is removed as high-pressure gas 46 by gas removal means 52. The first stage 50 may include utilization of a pressure vessel such as a three-phase vertical pressure tank.

One of the benefits of the first stage 50 is the catching and handling of the vast majority of the solids as soon as possible. A solids slurry 48, including the cuttings 32, is collected and removed from the returning stream 40 by solids removal means 54. The solids slurry 48 may then be processed with conventional treatment equipment as desired, including shale shakers, desilters and desanders. If an oil-based drilling fluid is employed, the solids slurry 48 will comprise oil-based fluids and solids. If a water-based drilling fluid is used, the slurry will include water and solids. The conventional treatment systems are capable of separating the base drilling fluid, whether oil or water based, from the solids so that the salvageable base drilling fluid may be returned to the well for further operation.

The remaining fluids, the treated returning fluids 60, which may include water 36, drilling base fluid 20, any formation gas 30 still remaining in the pressurized treated fluid 60, and formation oil 28, exit the first stage 50 by a fluid removal means 58.

The treated returning fluid 60 now enters a second stage separation process 70 to undergo a second stage of separation at a second pressure P2. Typically pressure P2 will be lower than pressure P1 to enhance further gas separation from the liquid treated return fluid 60. The pressure P2 may vary greatly, can be atmosphere pressure, and is typically around 5 to 10 psi. The second stage 70 may also include use of a three-phase vertical pressure tank. Production gas 30 and remaining additive gas 22 are removed more completely during the stage.

The major benefit of a multi-stage separation allows for more convenient and efficient handling of the smaller volume of gas released at the high pressure P1 combined with the more complete release of gas at the lower pressure P2. At the higher-pressure first stage 50, gas is released in a relatively lesser volume than at the lower pressure stage 70. At the lower pressure stage 70, more gas is released from the liquid resulting in more complete gas-liquid separation.

Another advantage of a multi-stage separation method is the reduction or elimination of foaming which can occur when a returning stream bearing formation gas undergoes a drastic drop in pressure. A two-stage separation process allows selection of pressures P1 and P2 to provide a gradual step-down in pressure selected to allow removal of formation gas from the returning stream at each pressure level without foaming. When higher pressures or greater gas volumes are encountered, more than two stages of pressure may be utilized.

Low-pressure gas 72 is removed from the treated returning fluid 60 by gas removal means 74. The low-pressure gas stream may be joined with the high-pressure gas 46 from the first stage 50, as shown in FIG. 1, by methods known in the art.

Where the well is producing hydrocarbons and water, or where the selected base drilling fluid is water, the water, a heavy liquid, is collected and removed by a heavy liquid removal means 76. The water may then be further treated as desired, such as for the removal of fine sediments, using conventional separation equipment and techniques 80, such as with desilters, vacuum degassers, mud pits and pumps.

The hydrocarbon formation oil 28 is removed in the second stage 70 by an oil removal means 78. If the oil is to be used as the base drilling fluid, it may be treated using conventional treatment methods and returned to use in the well. Where the well is producing only hydrocarbons, with virtually no water production, and the base fluid is oil based, it may not be necessary to remove two streams of fluid from the second stage 70 as shown in FIG. 1. Instead, a single stream of oil-based drilling fluid may be removed via a single outlet means.

The two stage method separates the returning stream into components: a solids slurry, which may include oil or water, high and low pressure gas, which may include hydrocarbon and additive gas; liquid hydrocarbon, and water. The liquid hydrocarbons or water may serve as the base drilling fluid and be circulated to the well after appropriate treatment. The two stage method presents advantages over a single stage method utilizing a four-phase separator which are prone to filling with solids and require much larger tanks. The efficiency of such four-phase separators is compromised by having the additional complexity and dedicated volumes necessary for all four phases.

The high and low-pressure gases 46 and 72 are measured by gas testing means 84 to determine at least the flow rate of formation gas 30 produced from the well. Other data, such as the pressure and temperature of the gas stream, the composition of the gas, or the produced gas percentage and specific gravity, may also be measured. It is understood that the high and low-pressure gases 46 and 72 may be measured separately or that the gases may be combined through appropriate methods and measured into a single stream of gas. The gas may then be stored, flared, directed to a pipeline or otherwise handled.

Similarly, the formation hydrocarbon oil 28 is measured by oil testing means 94 to determine at least the flow rate produced from the formation. Other data such as the specific gravity, volume or percent volume of the liquid, and the pressure and temperature of the liquid stream, may be measured as desired. The oil is then directed to conventional storage tanks or otherwise handled as explained above.

The solids slurry, and the liquids recovered from the slurry, may also be measured by testing means 96 for flow rate, pressure, temperature, solid types and percentages of each type. Lastly, any existing heavy liquids retrieved from the second stage 70 may be tested by testing means 98 for flow rate and other data.

The recovered drilling base fluid 20, which may be heavy water based fluids or light oil based fluids, is circulated back into the well as shown. The drilling base fluid 20 is passed through the mixer 24 where a volume of additive 22 may augment the fluid as needed to achieve a selected operating fluid specific gravity. The volume of additive 22 needed to achieve the required specific gravity is determined, at least in part, from the measured volume of formation gas and formation oil which was produced from the formation and separated using the described two-stage method. That is, after determining the flow rates, temperatures, pressures and other data, of formation hydrocarbons and water which became mixed with the operating fluid, the measured data can be used in conjunction to calculate the specific gravity needed for the operating fluid to maintain well stability in the under-balanced condition. Thereafter, the required amount of additive may be determined and mixed into the base drilling fluid. The system 10 offers a continuous separation of components, continuous measurements of those components, and continuous calculation of needed additives to be mixed into the base drilling fluid.

The fluid separation and control system 10 is shown in simplified form and it understood that the system may include further control devices such as tubing, valves, pumps, compressors, electrical control and signal devices and the like at any step of the process. It is further understood that the separation system may include three or more stages with a pressure step-down at each stage to further enhance gas removal and to help prevent foaming. The embodiment above may utilize two three-phase separator vessels or combinations of other known separator units to extract the gas, oil, drilling base fluids, water and cuttings, and further, that the order of the separation is not limited by the one preferred embodiment described above. Further, at any or each stage, further separation steps may be taken, such as the separation of heavy and light liquids during the first stage from the returning stream.

Figure 2:
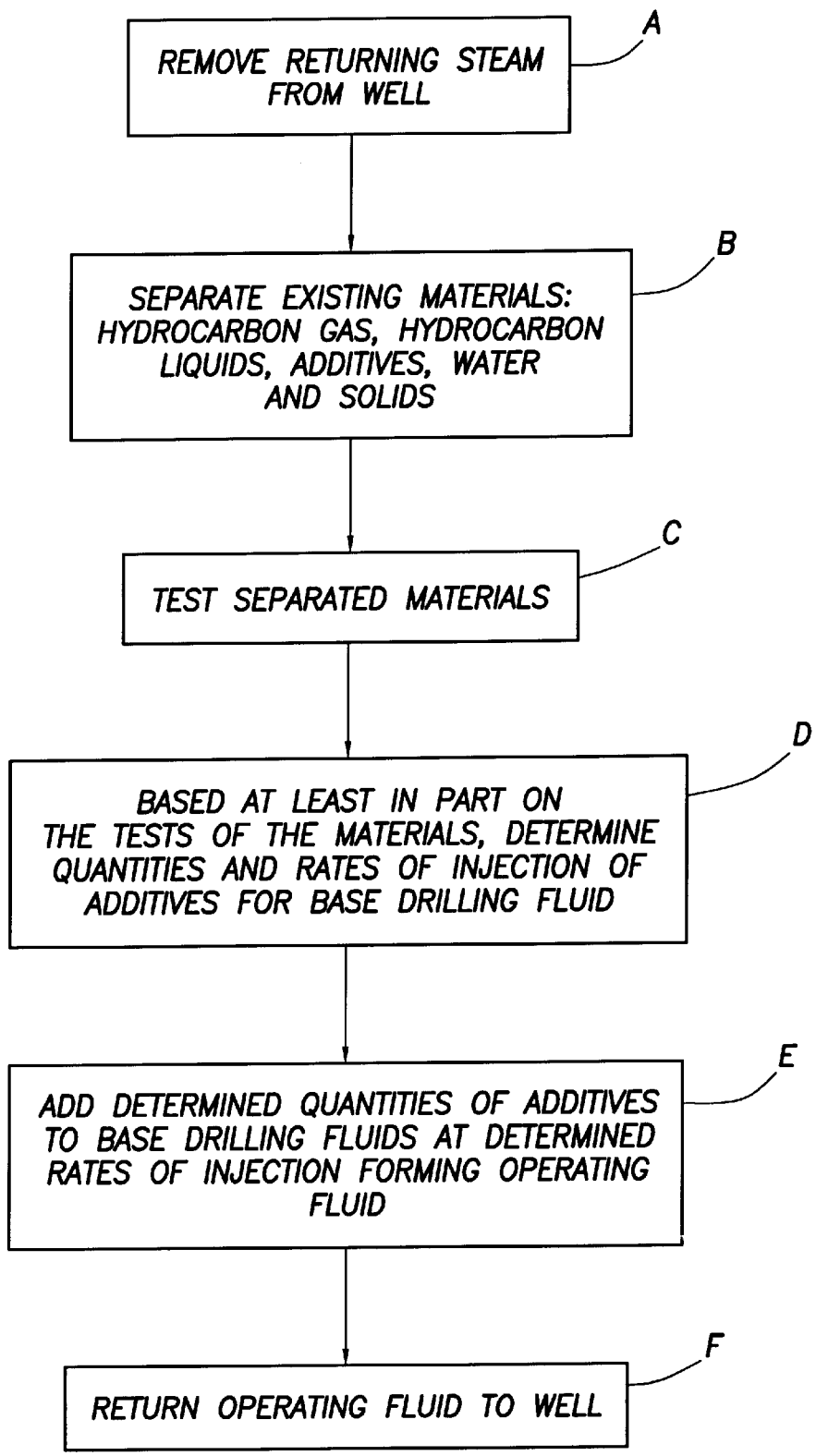
FIG. 2 is a flow diagram of an improved method of the present invention for controlling the drilling fluid during under-balanced drilling.

FIG. 2 shows a separation and control method for under-balanced drilling. A returning stream is removed from the well in step A. The returning stream may include base drilling fluid, additive, cuttings, formation gas, formation oil and water. Since the well is being drilled in an under-balanced condition, oil and gas from the subterranean well formation will mix with the operating fluid during operations. The returning stream will reach the surface wellhead under pressure. The returning stream may be removed from the well using pumps, valving and other equipment and methods known in the art.

In step B, formation oil and gas, water, additives and solids are separated from the returning fluid. The appearance of each of these components depends on the well production and selected additives and base drilling fluid. This step may be accomplished by the two-stage process explained herein. Further methods of conventional separation may be used as well, such as shale shakers, desilters, vacuum degasses, mud pits, atmospheric vessels and the like.

In step C, all returning materials are measured to determine their quantities. Other measurements and data may be extracted as well. Based at least in part on those quantitative measurements, in step D, quantities of additives for the base drilling fluid are determined. The measurement of the quantities of hydrocarbon materials produced from the well formation can be used to determine the required fluid specific gravity necessary to maintain and control underbalanced drilling. Other measurements, such as down-hole pressure and temperature, wellhead pressure and temperature, the pressures and temperatures of the separated components, the specific gravities and percentage composition of each of the components, and the like may also be used to help determine the quantities of additive to be added to the drilling fluid and the rates of injection of the additive. In step E, the determined quantities of additives are added to the base drilling fluid to achieve a selected operating fluid density. And in step F, the operating fluid is returned to the well.

Figure 3:
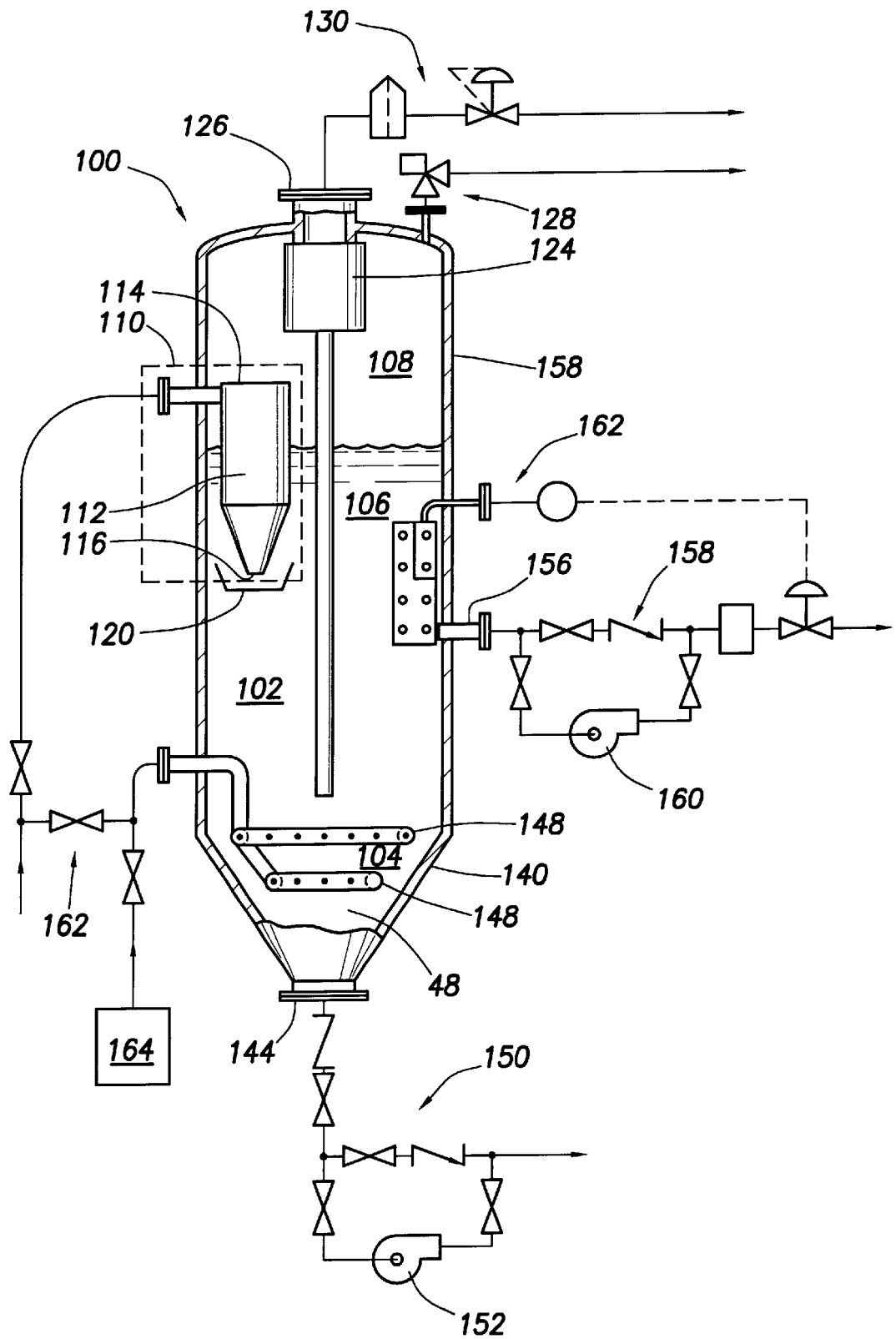
FIG. 3 is a section view of an embodiment of a separator of the present invention for use in separating drilling fluids in an under-balanced drilling operation.

FIG. 3 shows in detail one embodiment of a three-phase separator 100 for processing the returning stream 40 from an under-balanced drilling operation that may be used in the first stage separation process 50. The separator 100 comprises a vertical pressure vessel having an interior chamber 102 which is divided into a solids slurry section 104, a liquids section 106, and a gases section 108. The vessel 100 receives returning stream 40 through inlet 110. The returning stream 40 may, depending on the condition of the well formation and selected base drilling fluid, include formation oil, formation gas, water, base drilling fluids and cuttings, and is returned under pressure. The pressure P1 in the vessel chamber 102 may be selected over a wide range but is preferably around 25 psi to induce gas separation.

The inlet 110 may comprise a hydrocyclone assembly 112 as shown in FIG. 3. Hydrocyclone inlet diverter assemblies are known in the art and widely used as desanders and desilters, and may be purchased from various supply companies. The hydrocyclone assembly 112 is used in a unique fashion in the vessel 100 as shown. The assembly 112, mounted to receive the returning fluid through an opening, acts as an inlet diverter. The assembly 112 is shown mounted in the interior chamber 102, but may alternately be placed exterior to the pressure vessel 100, as is known in the art. The hydrocyclone assembly diverts the incoming returning stream 40 into a vortex in which centrifugal forces separate the gases 30, which exit through a top opening 114 of the assembly 112, from the solids and liquids which exit through a bottom opening 116 of the assembly 112. A vortex breaker 120, such as is known in the art, is designed to reduce or eliminate the vortex formed by the hydrocyclone and prevent the gases from reaching the liquids section 106. The hydrocyclone extends between the gases section 108 and the liquids section 106 of the interior chamber 102 so that the gases and solid-liquid mixtures are separated upon exiting the inlet 110.

Figure 4:
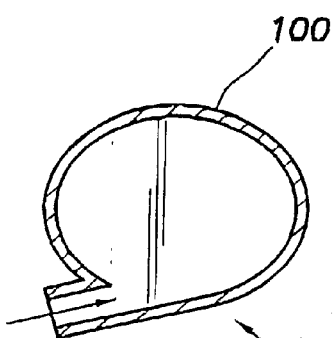
FIG. 4 is an alternate embodiment of an inlet for the separator of FIG. 3.
Figure 5:
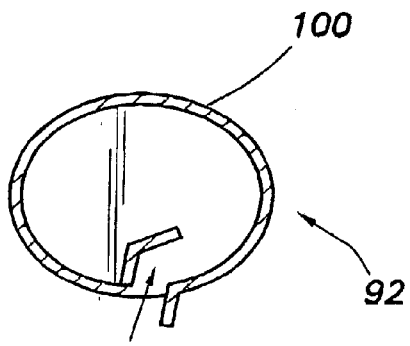
FIG. 5 is an alternate embodiment of an inlet for the separator of FIG. 3.
Figure 6A:
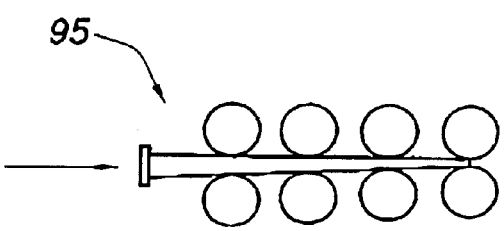
FIG. 6A is a top view of an alternate embodiment of an inlet for the separator of FIG. 3.
Figure 6B:
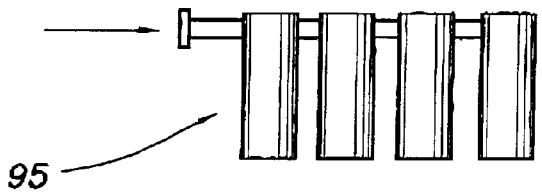
FIG. 6B is a side view of the alternate embodiment of the inlet of FIG. 6A.

The hydrocyclone assembly may be replaced with a tangential vessel assembly 90 shown in FIG. 4, a tangential diverter assembly 92 shown in FIG. 5, or a vortex tube cluster assembly 95 shown in FIGS. 6A and B. Each of these assemblies are known in the art; the vortex tube cluster being available from Porta-test, for example. For pressure drop reasons, multiple parallel inlet diverters may be used.

Again referring primarily to FIG. 3, gases 30 are contained in the gases section 108 of the interior chamber 102. An optional mist extractor 124, such as known in the art and available commercially from Burgess Manning, Peerless and other suppliers, may be employed to further separate any fine liquid droplets from the gases. A top chamber opening 126 provides an exit for the gases 30. Appropriate control and pressure valves 130 may be employed to control the exit of the gases from the chamber 102. Additionally, a relief valve system 128 may be provided as shown.

Solids handling and removal is of high importance. The bottom head 140 is preferably cone shaped for an enhancement in solids separation over more common ellipsoidal, flanged and dished, or spherical heads. A solids slurry 48, formed of the solids and either heavy liquids or light liquids of the returning stream 40, depending on the constituents of the returning stream, collects at the solids slurry section 104 at the bottom of the chamber 102 due to gravity. The solids slurry 48 is agitated or fluidized to enhance movement of the solids 32 towards and through a solids exit 144 in the bottom of the vessel 100. The slurry 48 movement is enhanced by a sparging line, a sparging ring, a vortex generator, and eductor, dynamic mixer sand pan or other agitating means or a combination thereof.

Figure 3A:
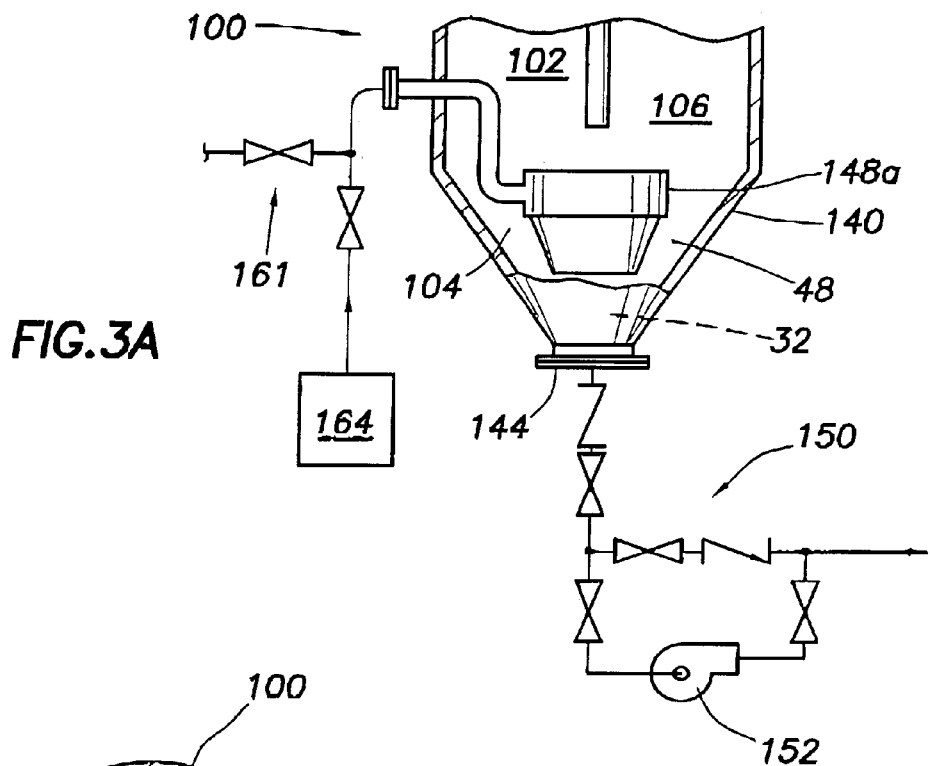
FIG. 3A is a close-up view of an alternate embodiment of the separator of FIG. 3 using a vortex generator.

Shown in FIG. 3 are dual sparging rings 148 which act to fluidize and agitate the solids as they move through the bottom of the chamber 102. The appropriate valving 162 and flush fluid supply 164 is provided. FIG. 3A depicts a close-up view of vessel 100 with a vortex generator 148a to enhance slurry movement. Vortex generators are available commercially from Merpo, among others.

Appropriate valving 150 and, if desired, a slurry pump 152 are provided to handle the solids as they exit the vessel 100. The solids slurry 48 may then be moved to a conventional handling system if desired. The solids may be measured and quantified upon leaving the vessel.

The liquids section 106 of the chamber 102 contains the returning fluids, which separate by gravity from the solids 32 and gases 30. The returning fluids may include the water, formation oil 28 and drilling base fluid 20 of the returning stream 40, and may also include any gases which remain in the liquid. In the preferred embodiment a liquid outlet 156 is contained in the side wall 158 of the chamber 102. Appropriate valving 159 pumps 160 and the like, known in the art, remove the treated liquid 60 from the chamber 102. Level control devices, such as level control device 161, may be employed as needed. Alternately, the chamber 102 may be provided with multiple liquid outlets vertically spaced to remove light hydrocarbon liquids and heavy drilling fluids, as is known in the art.

The treated liquids, upon leaving the vessel, are preferably removed to a second stage separation process. The second stage may include a second three-phase vertical pressure vessel of similar construction which operates at a lower pressure. The second stage vessel may separate the remaining liquid into gas, light liquids and heavy liquids, as desired, and may operate at a pressure different than that of the vessel 100.

The embodiments shown and described above are only exemplary. Many details are often found in the art such as: "Surface Production Operations," Arnold and Stewart. Therefore many such details are neither shown nor described. It is not claimed that all of the details, parts, steps or elements described and shown were invented herein. Even though numerous characteristics and advantages of the present invention have been set forth in the foregoing description, together with details of the structure and functions of the inventions, the disclosure is illustrative only, and changes may be made in detail, especially in matters of shape, size and arrangement of the parts within the principles of the inventions to the full extent indicated by the broad general meaning of the terms used in the attached claims.

The restrictive description and drawings of the specific examples above do not point out what an infringement of this patent would be, but are to provide at least one explanation of how to make and use the inventions. The limits of the inventions and the bounds of the patent protection are measured by and defined in the following claims.

What is claimed is:

1. A method of separating fluids present in a hydrocarbon well in an under-balanced drilling operation wherein operating fluid circulating through the well during drilling is mixed with well materials flowing into the wall from a surrounding well formation and is mixed with solids from the drilling operation and wherein a returning stream of mixed fluids and solids flowing out of the well is at an elevated pressure, comprising the steps of:

supplying the returning stream flowing out of the well to a vertically extending separation chamber with a substantially conical bottom head with a solids outlet therein;

separating the liquid, gas, and solids of the returning stream in the chamber;

collecting the solids in the bottom of the chamber by gravity; and removing the solids from the chamber by forming a moving slurry in the bottom of the chamber to agitate the solids and move them out through the solids inlet.

2. A method as in claim 1 wherein the moving slurry in the bottom of the chamber to agitate the solids and move them out through the solids outlet is formed by at least one sparging ring.

3. A method as in claim 1 wherein the moving slurry in the bottom of the chamber to agitate the solids and move them out through the solids outlet is formed by at least one sparging ling.

4. A method as in claim 2 wherein the moving slurry in the bottom of the chamber to agitate the solids and move them out through the solids outlet is formed by at least one vortex generator.

5. A method of drilling a hydrocarbon well as in claim 1 further comprising an inlet diverter for diverting the returning stream in the chamber into a vortex to separate the gas from the solids and liquids.

6. A method as in claim 5 wherein the inlet diverter comprises multiple parallel diverter units.

7. A method as in claim 5 wherein the inlet diverter comprises a hydrocyclone.

8. A method as in claim 5 wherein the inlet diverter comprises a tangential diverter.

9. A method as in claim 1 further comprising removing mist droplets from the gas after the gas is separated from the liquids and solids.

10. A method as in claim 1 wherein the chamber comprises at least one fluid outlet.

11. A method as in claim 10 wherein the chamber comprises a heavy fluids outlet and a light fluids outlet spaced vertically apart.

12. A method as in claim 11 further comprising controlling the level of the liquids in the chamber.

13. A method as in claim 1 wherein the moving slurry is removed from the chamber at least in part by a slurry pump operably attached to the solids outlet.

14. An vertically extending separation apparatus for separating materials from a returning stream from a hydrocarbon well in an under-balanced condition wherein operating fluid circulating through the well during drilling is mixed with well materials flowing into the well from a surrounding well formation and is mixed with solids from the drilling operation and wherein a returning stream of mixed liquid, gas and solids flowing out of the well is at an elevated pressure, comprising;

a pressure chamber having an interior wall, the chamber for separating the liquid, gas and solids of the returning stream;

a substantially conical bottom head in the chamber with a solids outlet therein, the bottom head of the chamber for collecting the solids by gravity to form a solids slurry; and an agitation means in the bottom head of the chamber for agitating the solids slurry to thereby move the solids out through the solids outlet.

15. An apparatus as in claim 14 wherein the agitation means comprises at least one sparging ring.

16. An apparatus as in claim 14 wherein the agitation means comprises at least one sparging line.

17. An apparatus as in claim 14 wherein the agitation means comprises at least one vortex generator.

18. An apparatus as in claim 14 further comprising an inlet diverter for diverting the returning stream in the chamber into a vortex to separate the gas from the solids and liquids.

19. An apparatus as in claim 18 wherein the inlet diverter comprises multiple parallel diverter units.

20. An apparatus as in claim 18 wherein the inlet diverter comprises a hydrocyclone.

21. An apparatus as in claim 18 wherein the inlet diverter comprises a tangential diverter such that the returning stream is diverted to vortex along the interior wall of the chamber.

22. An apparatus as in claim 14 further comprising a mist removal device for removing mist droplets from the gas that is separated from the liquids and solids.

23. An apparatus as in claim 14 further comprising at least one fluid outlet in the interior wall of the chamber.

24. An apparatus as in claim 23 wherein the at least one fluid outlet comprises a heavy fluids outlet and a light fluids outlet spaced vertically apart and extending through the interior wall of the chamber.

25. An apparatus as in claim 24 further comprising a level controller for controlling the level of the liquids in the chamber.

26. An apparatus as in claim 14 further comprising a slurry pump operably attached to the solids outlet for removing the solids slurry from the chamber.

* * * * *